United States Patent [19]

Jackson, Jr. et al.

[11] 4,327,581
[45] May 4, 1982

[54] METRIC HALF-SPAN MODEL SUPPORT SYSTEM

[75] Inventors: Charlie M. Jackson, Jr., Yorktown; Samuel M. Dollyhigh; David S. Shaw, both of Newport News, all of Va.

[73] Assignee: The United States of America as represented by the Administrator of the National Aeronautics and Space Administration, Washington, D.C.

[21] Appl. No.: 145,210

[22] Filed: Apr. 30, 1980

[51] Int. Cl.³ .............................................. G01M 9/00
[52] U.S. Cl. .................................................... 73/147
[58] Field of Search ............................. 73/147, 862.04

[56] References Cited

U.S. PATENT DOCUMENTS

| | | | |
|---|---|---|---|
| 2,582,814 | 1/1952 | Beman | 73/147 |
| 2,909,061 | 10/1959 | Gelbach | 73/147 |
| 2,910,866 | 11/1959 | Czerwinski | 73/147 |
| 3,005,339 | 10/1961 | Loftin | 73/147 |
| 3,233,452 | 2/1966 | Jones | 73/147 |
| 3,276,251 | 10/1966 | Reed | 73/147 |
| 4,107,986 | 8/1978 | Jones | 73/147 |

FOREIGN PATENT DOCUMENTS 128308 7/1959 U.S.S.R. .............................. 73/147

*Primary Examiner*—Kyle L. Howell
*Assistant Examiner*—Denis E. Corr
*Attorney, Agent, or Firm*—Wallace J. Nelson; John R. Manning; Howard J. Osborn

[57] ABSTRACT

The invention relates to a model support system used to support a model in a wind tunnel test section. The model comprises a metric, or measured, half-span 12 supported by a nonmetric, or nonmeasured half-span 11 which is connected to a sting support 13. Moments and forces acting on the metric half-span 12 are measured without interference from the support system during a wind tunnel test.

3 Claims, 5 Drawing Figures

METRIC HALF-SPAN MODEL SUPPORT SYSTEM

ORIGIN OF THE INVENTION

The invention described herein was made by employees of the U.S. Government and may be manufactured and used by or for the Government for governmental purposes without the payment of any royalties thereon or therefor.

BACKGROUND OF THE INVENTION

Wind tunnel studies provide solutions to a wide range of aerodynamic problems, including the effect of drag, aircraft lifting characteristics, static stability, pressure distributions, and flutter characteristics. Data are usually acquired through the measurement of forces and moments acting upon a model and by changes produced in the airstream by the model. The fundamental instrumentation approach for detecting and measuring these effects is based upon providing a supporting structure for the model in which reactive forces and moments are generated in maintaining the model virtually motionless with respect to the wind tunnel structure. The reactions to yaw, pitch, roll, lift, side and drag components can then be effectively isolated from each other and separately detected.

To guarantee the accuracy of the measurements, it is essential to reduce any collateral effects resulting from interference caused by the supporting structure. For example, if the support attached to the model interferes with the normal flow of air around the model, this interference will create an error in the measurement of data. Similarly, if the supporting structure causes a distortion of the configuration geometry of the model, the accuracy of the determination of reacting moments and forces will be reduced.

PRIOR ART

Previous systems for supporting a model in a wind tunnel include two major categories: symmetric sting/balance supports and half-span splitter plate supports. With a sting/balance support, a balance, or force and moment transducer, is attached to a model either externally or internally. For example, a rear sting mount is used to obtain the aerodynamic effects on the forebody/wing combination and a forward blade mount is used to obtain the effects on an afterbody/tail combination. However, a sting mounting system inevitably results in some distortion of the model configuration or, depending upon the position of the sting model support, some unwanted effect on the air flow around the model.

The prior art half-span splitter plate method uses the concept of a reflection plate parallel to the wind stream and located at the model plane of symmetry to provide support for one-half of the model. The reflection plate, however, changes the airflow causing aerodynamic interference effects.

SUMMARY OF THE INVENTION

Thus, a need continues to exist for a wind tunnel model support system which does not interfere with the accuracy of the measurement of data.

Accordingly, it is an object of this invention to provide a system for supporting a model in a wind tunnel which does not interfere with the aerodynamic flow of air around a model.

It is another object of this invention to provide a system for supporting a model in a wind tunnel which does not distort the configuration geometry of the model.

These and other objects are accomplished by the present invention by providing a model support system utilizing a nonmeasured, or nonmetric, half-span to support a measured, or metric, half-span. The two half-spans are symmetrical and connected at the plane of symmetry of the model by an enclosed airtight seal. A symmetrical balance is located at the center of the model and a sting support is attached to the wing tip of the nonmetric, or support, half-span. The forces and moments acting on the metric half-span are measured free from unnatural interference from the nonmetric support half.

BRIEF DESCRIPTION OF THE DRAWINGS

A more complete appreciation of the invention and many of the attendant advantages thereof will be readily attained as the same becomes better understood by reference to the following detailed description when considered in connection with the accompanying drawings, wherein:

FIG. 3 is a side view of the nonmetric model half-span and sting support as seen along line 3—3 of FIG. 2;

FIG. 4 is a sectional view of the assembled model halves taken along line 4—4 of FIG. 1; and FIG. 5 is a sectional view of the assembled model halves taken along line 5—5 of FIG. 1.

DETAILED DESCRIPTION OF THE INVENTION

Figure 1:
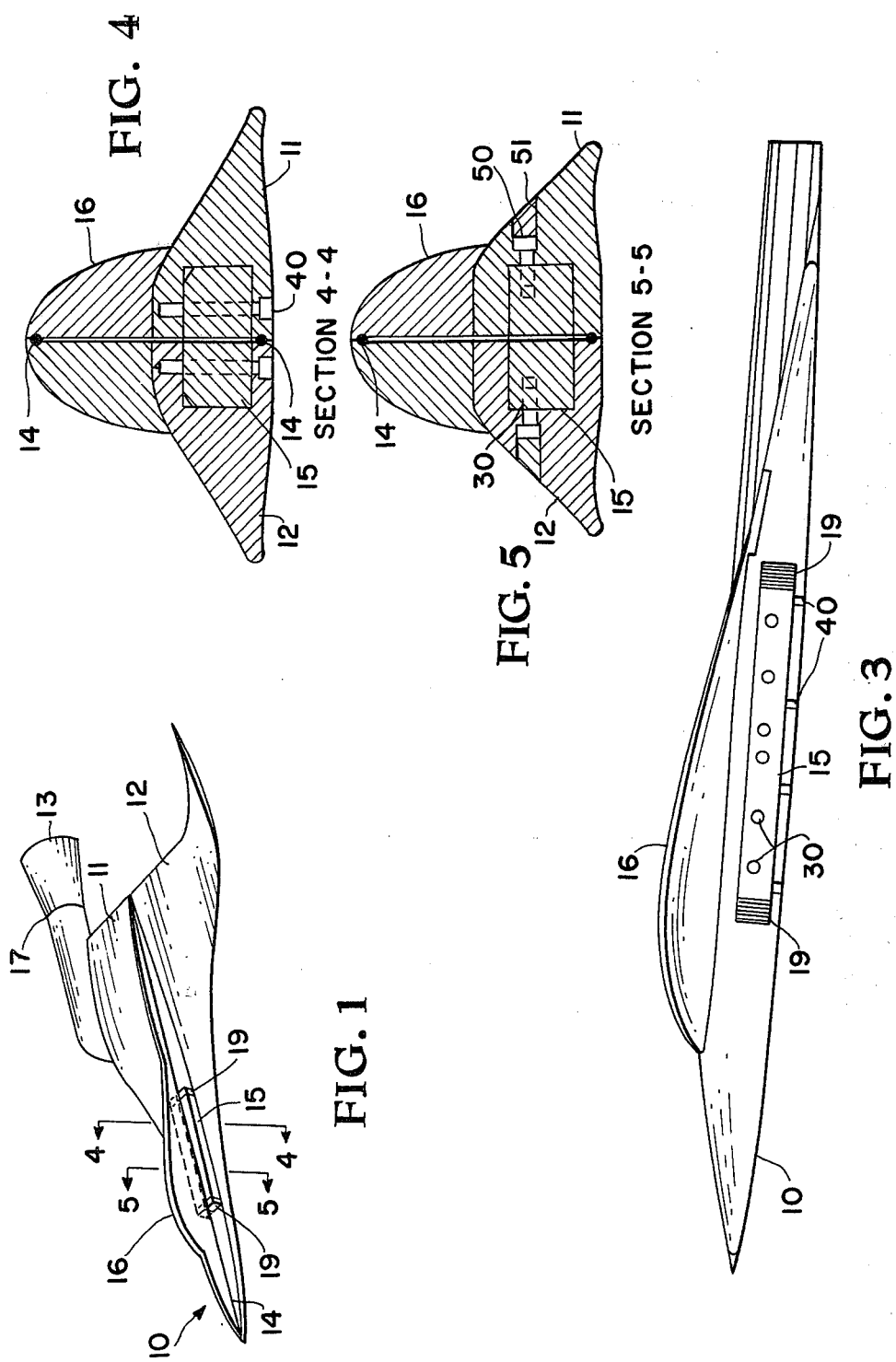
FIG. 1 is a perspective of the entire model of the present invention with parts broken away and parts in section.

Referring now more particularly to FIG. 1, there is shown an illustration of a model 10 according to the present invention used in wind tunnel investigations. Symmetric model 10 comprises metric half-span 12 and nonmetric half-span 11. Strain gauge balance 15 is positioned between metric half-span 12 and nonmetric half-span 11. In the preferred embodiment of the present invention, strain gauge balance 15 is rectangular and constructed of a stiff metallic material such as, for example, stainless steel. The beams 19 of balance 15 are separated by a relatively long length in order to maintain pitch measurement fidelity without encountering significant deflection of the apparatus during testing. In other respects, balance 15 is a conventional strain gauge balance constructed according to principles well known in the art. Half-spans 11 and 12 are connected to balance 15 by means of bolts 50 (FIG. 5) extending horizontally through bolt holes 30 and by bolts 40 (FIG. 4) extending vertically into balance 15 from the bottom of model 10. A sealing gasket 14 is positioned in grooves (not designated) which extend along the inside perimeters of metric half-span 12 and nonmetric half-span 11. Gasket 14 is formed of a suitable compliant or elastomeric material such as, for example, neoprene or silicon rubber. In the preferred embodiment, a soft 3/16 inch diameter neoprene seal was utilized. When metric half-span 12 and nonmetric half-span 11 are connected to balance 15, the pressure forcing the two half-spans together, achieved by tightening bolts 50 (FIG. 5), creates an airtight seal between half-spans 11 and 12. Gasket 14 is positioned between half-spans 11 and 12 near the model surface at the metric break and thus functions as an O-ring seal to prevent air flow through the model during a test. Cantilevered faired beam sting support 13 is attached to the wing tip 17 of nonmetric half-span 11. Sting support 13 is also attached to a support in the wind tunnel test section (not shown). Measurements of moments and forces are taken on metric half-span 12 in a conventional manner by means of strain gauges (not shown) positioned on beams 19 of balance 15. A four component balance is employed to provide a minimum of deflection or scissor effect at the metric break. This balance design does not include side force or yawing moment but this component measurement could be readily added if needed and the simpler four component balance design was chosen for verification of the inventive concept. The balance loads in this system are: Normal force=890 N (200 lb); Axial force=178 N (40 lb); Pitching moment=226 Nm (2000 inch-lb); and Rolling moment=102 Nm (900 inch-lb).

Figure 2:
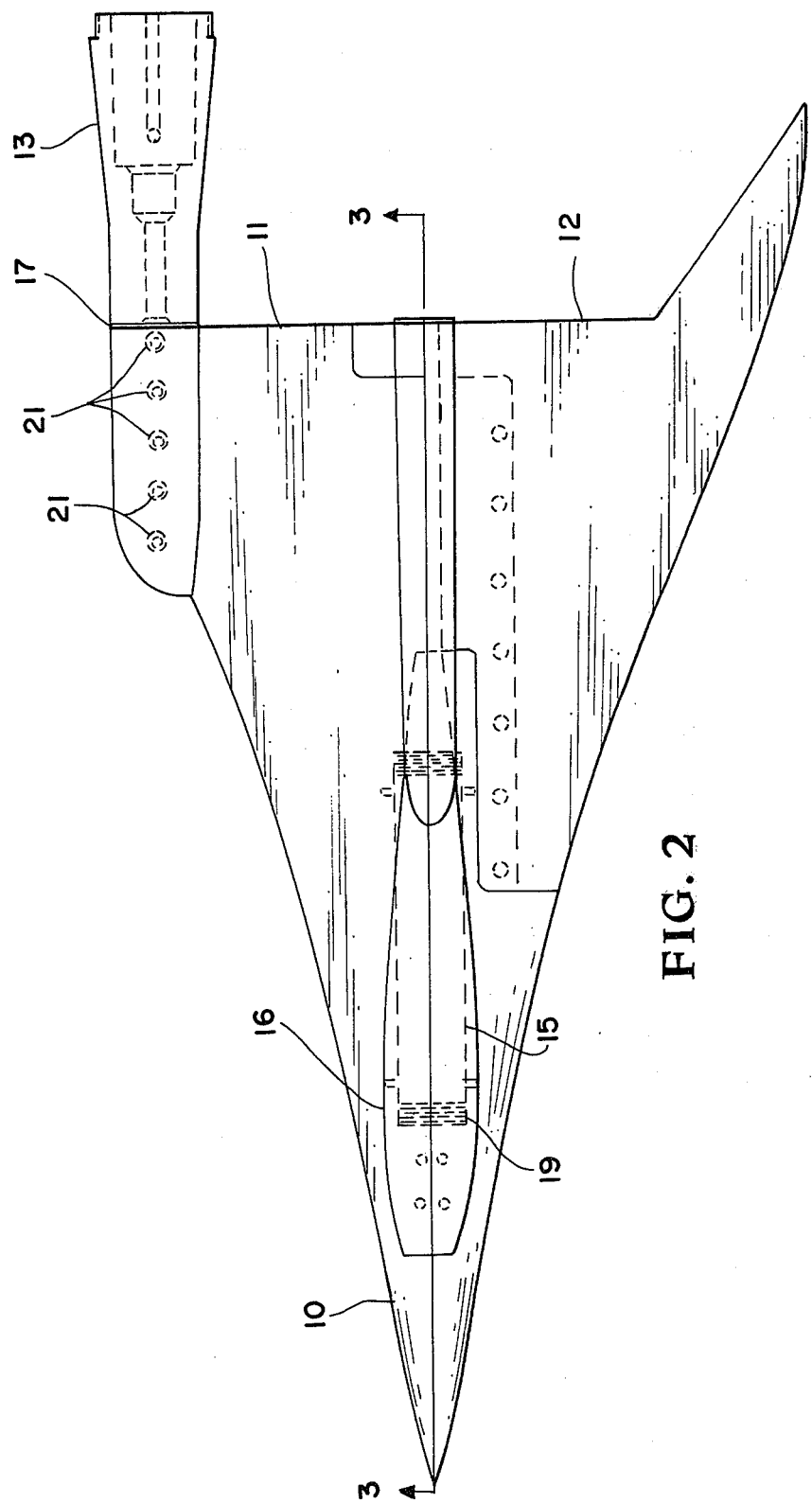
FIG. 2 is a top view of the assembled model half-spans, shown in FIG. 1.

Referring now to FIG. 2, the attachment of sting support 13 to the wing tip 17 of nonmetric half-span 11 can be clearly seen. Bolts 21 secure sting support 13 to the model 10 and maintain nonmetric half-span 11 fixed.

FIG. 3 provides a clear indication of the position of balance 15 relative to model 10. Bolt holes 30 and beams 19 are more clearly shown in this figure.

Referring now to FIG. 4, a sectional view of model 10 taken along line 4—4 of FIG. 1 is shown. As shown therein sealing gasket 14 extends completely around the interior of model halves 11 and 12 and is used to maintain an airtight seal between metric half-span 12 and nonmetric half-span 11. Balance 15 can be seen to be symmetrical relative to metric half-span 12 and nonmetric half-span 11.

Referring now to FIG. 5, a view of model 10 taken along line 5—5 of FIG. 1 is shown. Typically, bolt access passageways 51 are filled after bolts 50 are tightened.

The filling of bolt access passageway 51 provides a smooth aerodynamic surface to the exterior of the model halves. Metal/solder, wood putty or any other conventional filler material may be employed for closing access passageways 51 with any excess filler being removed by machining, sanding, polishing or the like, to give a faired surface to model 10.

OPERATION

The operation of the invention is now believed apparent. The support for the metric half-span 12 is provided by nonmetric half-span 11 in conjunction with sting support 13. Because the support of metric half-span 12 is located on the plane of symmetry of model 10, there is no distortion of the geometric configuration of the metric half of model 10. Further, because the supporting nonmetric half-span 11 is symmetrical relative to metric half-span 12, there is no alteration of the aerodynamic flow of air around the metric half of model 10 during testing.

With tests at subsonic speeds, the distortion effects of the sting mounting mechanism 13 are greatly reduced due to the remoteness of the mount. At supersonic speeds where the metric half-span 12 is forward of the Mach cone emitting from sting support 13, Schlieren and oil-flow photographs show no evidence of flow field interference from the sting support.

Although no specific material has been discussed for model 10, the model in the preferred embodiment of the present invention is constructed of steel. Any suitable rigid material such as, for example, aluminum, titanium, metal alloys, composites and the like may be employed for the model construction without departing from the spirit and scope of the invention.

Thus, the illustrations described herein are considered merely representations of the preferred embodiment of the invention. The invention is not so limited and many modifications and variations thereof will be readily apparent to those skilled in the art in the light of the foregoing description without departing from the spirit and scope of the invention.

What is claimed as new and desired to be secured by Letters Patent of the United States is:

1. A wind tunnel model and support system for use in a wind tunnel test section comprising in combination:
    a symmetrical model of an aircraft having wings;
    said symmetrical model comprising a metric half-span and a nonmetric half-span;
    said metric half-span being adjacent to said nonmetric half-span at the plane of symmetry of said model;
    sting support means attached to the wing tip of said nonmetric half-span and adapted for attachment to a wind tunnel test section;
    a strain gauge balance positioned within the fuselage of said symmetrical model and connected to said metric half-span and to said nonmetric half-span;
    said sting support means being disposed parallel to the model plane of symmetry and aft of the strain gauge balance position to thereby minimize airflow interference around the model and avoid affecting said strain gauge balance measurements;
    a sealing gasket positioned between said metric half-span and said nonmetric half-span; and
    said gasket creating an airtight interface between said metric half-span and said nonmetric half-span.

2. A wind tunnel model support system as in claim 1 wherein said sting support means comprises a cantilevered faired beam extending from the rear of said wing tip of said nonmetric half-span.

3. A method for supporting a model in a wind tunnel test section which comprises:
    providing a symmetrical model of an aircraft having wings and comprising a metric half-span and a nonmetric half-span;
    providing a strain gauge balance for measuring moments and forces on the model;
    positioning the balance between the metric half-span and the nonmetric half-span;
    positioning a sealing gasket within grooves extending along the perimeters of the insides of the half-spans;
    connecting the metric half-span to the balance so as to maintain the metric half-span adjacent to the nonmetrc half-span thereby creating an airtight seal;
    connecting the nonmetric half-span to the balance;
    attaching the nonmetric half-span to a fixed sting support in the wind tunnel test section such that the sting support does not interfere with aerodynamic air flow around the model during testing; and
    measuring the moments and forces acting on the metric half-span during a wind tunnel test.

* * * * *